Jan. 2, 1962    G. P. FULTON ET AL    3,015,504

TEMPERATURE COMPENSATED SEAL

Filed June 27, 1957

INVENTORS
GEORGE P. FULTON
RALPH S. LOMBARD

BY *M. B. Tasker*

ATTORNEY

United States Patent Office 3,015,504
Patented Jan. 2, 1962

---

3,015,504
TEMPERATURE COMPENSATED SEAL
George P. Fulton, Bel Air, Md., and Ralph S. Lombard, East Hartford, Conn., assignors to United Aircraft Corporation, East Hartford, Conn., a corporation of Delaware
Filed June 27, 1957, Ser. No. 668,536
6 Claims. (Cl. 286—11.13)

This invention relates to face seals and has as one of its objects the provision of a seal of the rubbing variety which is compensated for temperature effects resulting from the different coefficients of thermal expansion between the seal material and the structural seal supporting material.

Another object of the invention is to provide improved seal supporting means which supports the seal under conditions of wide temperature variations without subjecting the seal to stress due to expansion and contraction of the seal or the seal supporting structure.

A more specific object of the invention is to provide mutually engaging supporting surfaces for the seal member and its support member which lie along oblique lines, the angles of which lines are determined by the resultant of radial and axial expansion of the seal and support members.

A further object of the invention is to provide a seal construction in which the seal and its support remain in firm contact over a wide range of temperature variations.

A yet further object of the invention is to provide a face seal and a support therefor capable of withstanding violent fluctuations in temperature without destroying seal face flatness.

A further object of the invention is to generally improve the construction and effectiveness of face seals. These and other objects and advantages of the invention will be apparent or will be pointed out in connection with the following detailed description of a preferred embodiment of the invention shown in the accompanying drawing.

Figure 1:
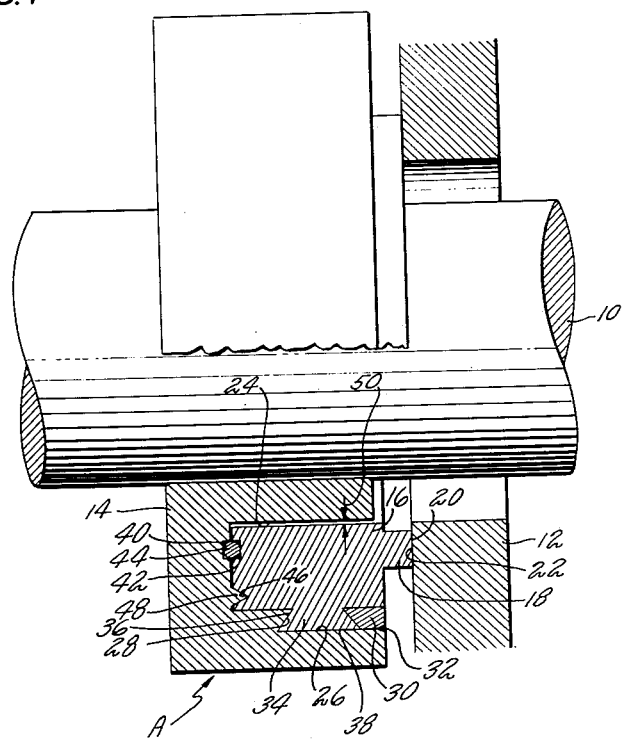
Figure 2:
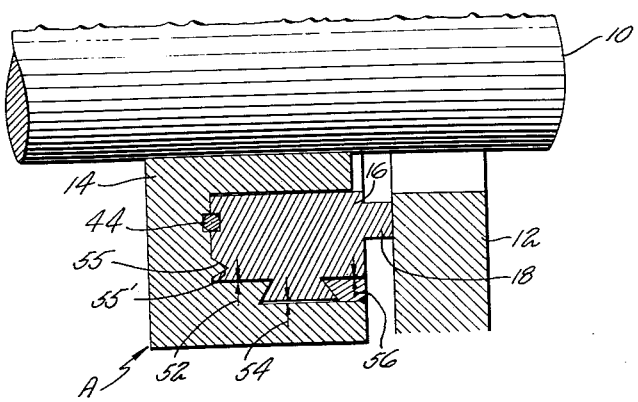

In this drawing, FIG. 1 is a side elevation, partly in section, of a seal structure embodying the invention, the parts being shown in the cold, or contracted position. FIG. 2 is a similar view with parts broken away showing the seal and its supporting structure in the expanded, or hot, condition.

In the drawing, the face seal generally indicated at A, provides a fluid tight seal between the rotatable shaft 10 and the nonrotatable seal ring 12 which may be carried by a casing through which the shaft extends.

The seal includes an annular support member 14 which is fixed to shaft 10 in a fluid tight manner, and an annular face seal member 16 carried thereby, having an annular portion 18 of reduced cross section. Portion 18 has an annular flat seal face 20 which cooperates with a confronting flat face 22 on seal ring 12 to provide the rubbing face seal. Seal ring 12 is constantly biased by means, not shown, into engagement with member 16. An important feature of the invention resides in the manner of supporting the face seal 16 so that surfaces 20 and 22 will always be maintained in parallel relationship during thermal expansion which may affect both the support member 14 and the face seal member 16.

Support member 14 is provided with a large annular recess 24, the open end of which confronts the flat surface 22. The face seal 16 is received in this recess and rotates with the shaft 10 and the support member 14. Recess 24 on its outer cylindrical surface is provided with a dovetailed groove which consists of a cylindrical outer surface 26 and two oblique surfaces 28. In order to facilitate manufacture and to enable the member 16 to be inserted in recess 24, one side of the dovetail consisting of an annular ring 30 is separately formed and is welded to the member 14 at 32 after the seal member 16 is in place in the recess.

Member 16 is ring-shaped and has on its outer periphery a dovetailed tongue 34 which, in the cold position of the parts shown in FIG. 1, is a close fit in the dovetailed groove in member 14. Thus, the oblique surfaces 36 of tongue 34 are in contact with the like surfaces 28 of the dovetail groove in member 14, and the annular cylindrical surface 38 is in contact with the cylindrical surface 26 in the member 14.

At the end of the recess 24, the member 14 and the face seal member 16 are provided with confronting annular grooves 40 and 42 which are rectangular in section and in which a metal O-ring 44 is located. The function of the O-ring is to seal against leakage between 14 and 16. The compression on the O-ring is somewhat relaxed at elevated temperatures. To prevent leakage at elevated temperatures the face seal member 16 is provided with a triangular annular groove 46 which receives a triangular projection 48 formed in the bottom of recess 24. The oblique faces 55 of the groove and 55' of the projection have an angle which is slightly different from that which would be the resultant of axial and radial growth of the material and hence these faces grow together slightly when heated, i.e. the faces are brought into increased pressure engagement.

The coefficient of thermal expansion of the material comprising the support member 14 and the face seal 16 is inherently different since each is chosen for a different function. For this reason, the member 14 will have a greater coefficient of expansion than the face seal 16. By way of example, the coefficient of expansion of a material best suited for the face seal may be 1 and that which makes the best support member therefor may be 2. We have found the angle of the oblique surfaces 28 and 36 on the support member 14 and the face seal member 16 to be important. We form these oblique angles so that, on temperature change affecting members 14 and 16, the engaging oblique surfaces 28 and 36 will continue to lie along the same line for both materials. This line must be the resultant of the radial and axial expansion lines of both members 14 and 16, in order that these two oblique surfaces may maintain their engagement throughout wide temperature variations affecting the two dissimilar materials.

In FIG. 2, the parts are shown in operation and indicate the relative position of the parts when they are hot. It will be noted that in FIG. 1 all of the outer cylindrical surfaces of the ring-shaped face seal 16 are in engagement with the corersponding cylindrical surfaces of the support member 14 but that there is a clearance space 50 between the inner periphery of the face seal 16 and the inner wall of recess 24. As the face seal and its support are heated, however, the space 50 diminishes and clearance spaces 52, 54 and 56 appear at the outer periphery of the face seal 16. It will be noted, however, that the oblique surfaces 36 remain in contact with the oblique surfaces 28 because the angle chosen corresponds with the resultant direction of growth between the face seal member 16 and the support member 14. Stresses resulting from the annular projection 48 and its mating recess 46 and from the O-ring seal 44 are reacted at the annular mating sets of oblique surfaces 28 and 36 and hence do not affect the seal face flatness. It will be understood that because the mating surfaces 28 and 36 are annular, are oppositely oblique, and are always in engagement, they provide complete support for the ring-shaped face seal 16 at all times irrespective of changes in temperature. When at the high temperature end of the temperature range, for example, the projection 48 is forced into pressure engagement with the triangular groove 46, the forces exerted against face seal 16 by projection 48 are resisted by annular surfaces 28 and 36. As a result the face seal 16 is never forced out of its normal plane in which its annular flat face 20 is parallel with the face 22 of nonrotatable seal ring 12.

It will be understood that the support member 14 is tightly mounted on the shaft 10 so that the seal structure, above described, provides a fluid tight seal between the shaft and the casing in which the nonrotatable seal ring 12 is also tightly mounted.

While the component 14 of the seal has been shown as mounted on the shaft and the component 12 as mounted in the casing, it will be understood that the position of these seal components may be reversed if desired. Under some conditions such a reversal has advantages since it would avoid centrifugal forces acting on the temperature compensated member of the seal. Also, the situating of component 14 in the shaft and bearing housing of a machine would, in some cases, ease the problem of providing means to bias seal ring 12 as against seal member 16. An additional advantage to reversing the rotatable and nonrotatable seal components, which might become important in some cases, is to minimize stresses in member 14 during assembly which might result if it were attached to shaft 10 under press fit or shrink assembly.

It will be evident that as a result of the construction, above described, a face seal has been provided which is effective over a wide temperature range and one that is simple in construction and sufficiently rugged to avoid trouble in service. It will also be evident that as a result of the particular angle of the oblique surfaces on the dovetails, it is possible to maintain the flatness of these surfaces under all conditions of temperature encountered in service. Further, it will be evident that as a result of this invention it is possible to use the optimum material for the face seal member and for the seal support member even though they may have widely different coefficients of thermal expansion.

While only one embodiment of the invention has been shown and described herein, it will be understood that various changes in the construction and the arrangement of the parts may be made without departing from the scope of the invention.

We claim:

1. In a face seal, a seal member having one coefficient of thermal expansion, a support member for said seal member having a different coefficient of expansion, and means for maintaining said members in contact over certain mating areas during a wide range of temperature variation including mating oblique surfaces on said members, the angle of certain of said mating surfaces being chosen to lie on the same line for both members which is the resultant of the radial and axial expansion of said members, and the angle of others of said mating surfaces being chosen to lie on a line which is slightly different from the resultant of axial and radial growth of said members, whereby the surfaces will grow together slightly when heated.

2. In a face seal, a shaft, a seal support member on said shaft having a concentric annular recess, an annular seal member received in said recess, said members having different coefficients of thermal expansion, and means for maintaining said members in contact over certain mating areas during a wide range of temperature changes including a dovetail groove in a cylindrical wall of said recess and a dovetail tongue on an adjacent cylindrical wall of said seal member, the angle of the mating oblique surfaces of said dovetails being so chosen that these surfaces lie on the same line for both materials which is the resultant of the radial and axial expansion of said members.

3. In a face seal, a shaft, a seal support member on said shaft having a concentric annular recess, an annular seal member received in said recess, said members having different coefficients of thermal expansion, means for maintaining said members in contact over certain mating areas during a wide range of temperature changes including a dovetail groove in a cylindrical wall of said recess and a dovetail tongue on an adjacent cylindrical wall of said seal member, the angle of the mating oblique surfaces of said dovetails being so chosen that these surfaces lie on the same line for both materials which is the resultant of the radial and axial expansion of said members, an annular recess in said seal member confronting the bottom of the recess in said support member, said annular recess having angularly related sidewalls, an annular projection on said support member which registers with said annular recess in said seal member, said projection having angularly related surfaces which mate with said angularly related sidewalls, the oblique mating surfaces of said angular recess and projection being slightly different from the resultant of axial and radial growth of said members.

4. In a face seal, a shaft, a seal support member on said shaft having a concentric annular recess, an annular seal member received in said recess, said members having different coefficients of thermal expansion, means for maintaining said members in contact over certain mating areas during a wide range of temperature changes including a dovetail groove in a cylindrical wall of said recess and a dovetail tongue on an adjacent cylindrical wall of said seal member, the angle of the mating oblique surfaces of said dovetails being so chosen that these surfaces lie on the same line for both materials which is the resultant of the radial and axial expansion of said members, and means for effecting a seal between said members at elevated temperatures comprising an annular projection of triangular cross section on the bottom of said recess and a mating triangular recess formed in the adjacent end of said seal member.

5. In a face seal, a shaft, a seal support member on said shaft having a concentric annular recess, an annular seal member received in said recess, said members having different coefficients of thermal expansion, means for maintaining said members in contact over certain mating areas during a wide range of temperature changes including a dovetail groove in a cylindrical wall of said recess and a dovetail tongue on an adjacent cylindrical wall of said seal member, the angle of the mating oblique surfaces of said dovetails being so chosen that these surfaces lie on the same line for both materials which is the resultant of the radial and axial expansion of said members, means for effecting a seal between said members at elevated temperatures comprising an annular projection of triangular cross section on the bottom of said recess and a mating triangular recess formed in the adjacent end of said seal member, confronting annular recesses of rectangular cross section formed in the adjacent surfaces of said members at the bottom of said recess, and an O-ring seal located in said rectangular recesses.

6. In a face seal, a first annular member having an annular flat face, a second annular member having an annular recess therein confronting the annular face on said first member, one of said members being nonrotating and the other being supported for rotation relative to said nonrotating member, a third annular member received in said recess having an annular portion of decreased area abutting said annular face, said second and said third members being of material having dissimilar coefficients of expansion, the coefficient of expansion of said second member being greater than that of said third member, an annular dovetail tongue on the outer cylindrical wall of said third member, a cooperating dovetail groove on the adjacent cylindrical sidewall of said recess receiving said tongue, said groove and said tongue having a close fit at normal temperature, the angle of the lines of said dovetails being the resultant of the radial and axial expansion of said dovetailed members, whereby upon temperature variation affecting said members the oblique surfaces of said dovetails will remain in sliding engagement with each other and no stress will be exerted on the seal.

References Cited in the file of this patent

UNITED STATES PATENTS

| | | | |
|---|---|---|---|
| 858,859 | Dalen | July 2, | 1907 |
| 1,047,988 | Rearick | Dec. 24, | 1912 |
| 1,393,610 | Candee | Oct. 11, | 1921 |
| 1,523,817 | Long | Jan. 20, | 1925 |
| 1,883,509 | Boone | Oct. 18, | 1932 |
| 2,336,323 | Warren | Dec. 7, | 1943 |
| 2,590,761 | Edgar | Mar. 25, | 1952 |
| 2,695,184 | Hobbs | Nov. 23, | 1954 |
| 2,698,195 | Pollard | Dec. 28, | 1954 |
| 2,930,409 | Higgins | Mar. 29, | 1960 |

FOREIGN PATENTS

| | | | |
|---|---|---|---|
| 161,259 | Great Britain | Apr. 4, | 1921 |
| 484,540 | Germany | Oct. 16, | 1929 |